United States Patent
Mieyan

(10) Patent No.: US 11,142,028 B2
(45) Date of Patent: Oct. 12, 2021

(54) ELECTRONIC UNIT FOR MEASURING OPERATING PARAMETERS OF A VEHICLE WHEEL

(71) Applicants: Continental Automotive France, Toulouse (FR); Continental Automotive GmbH, Hannover (DE)

(72) Inventor: Jérémy Mieyan, Saiguede (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/645,930

(22) PCT Filed: Jun. 26, 2018

(86) PCT No.: PCT/FR2018/051549
§ 371 (c)(1),
(2) Date: Mar. 10, 2020

(87) PCT Pub. No.: WO2019/002747
PCT Pub. Date: Jan. 3, 2019

(65) Prior Publication Data
US 2020/0223265 A1    Jul. 16, 2020

(30) Foreign Application Priority Data

Jun. 27, 2017    (FR) ....................... 1755855

(51) Int. Cl.
*B60C 23/04*    (2006.01)
*B60C 19/00*    (2006.01)
(Continued)

(52) U.S. Cl.
CPC .......... *B60C 23/0452* (2013.01); *B60C 19/00* (2013.01); *B60C 23/041* (2013.01);
(Continued)

(58) Field of Classification Search
None
See application file for complete search history.

(56) References Cited

U.S. PATENT DOCUMENTS 5,988,245 A    11/1999  Rosenberg
6,899,153 B1*   5/2005  Pollack ............... B60C 23/0408
                                                       152/152.1
(Continued)

FOREIGN PATENT DOCUMENTS

EP    1632880 A1    3/2006
EP    2000331 A2   12/2008
JP    2003165316 A  6/2003

OTHER PUBLICATIONS

International Search Report and Written Opinion for International Application No. PCT/FR2018/051549, dated Oct. 1, 2018, 8 pages.

*Primary Examiner* — Herbert K Roberts
(74) *Attorney, Agent, or Firm* — RatnerPrestia

(57) ABSTRACT

A tire monitoring system electronic unit suitable for being mounted either on the tire inflation valve or on the internal surface of the tire. The system includes electronics for managing the electronic unit including sensors for measuring parameters of the tire, a microprocessor and a supply battery, and an antenna configured to be mountable on the management electronics; a way of securing the antenna and the electronic managing device to each other; the management electronics thus forming a common base capable of being used with an antenna that can be adapted to the intended location of the electronic unit, either on the tire inflation valve or on the internal surface of the tire.

13 Claims, 5 Drawing Sheets

(51) Int. Cl.
*B60C 23/20* (2006.01)
*H01Q 1/12* (2006.01)
*H01Q 1/32* (2006.01)
*H01Q 7/00* (2006.01)

(52) U.S. Cl.
CPC ...... *B60C 23/0486* (2013.01); *B60C 23/0493* (2013.01); *B60C 23/0494* (2013.01); *B60C 23/20* (2013.01); *H01Q 1/12* (2013.01); *H01Q 1/3291* (2013.01); *B60C 2019/004* (2013.01); *H01Q 7/00* (2013.01)

(56) References Cited

U.S. PATENT DOCUMENTS

| | | | | |
|---|---|---|---|---|
| 2005/0087593 | A1* | 4/2005 | Benedict | B60C 23/0493 235/375 |
| 2006/0272402 | A1* | 12/2006 | Yin | B60C 23/0408 73/146.8 |
| 2008/0074251 | A1* | 3/2008 | Marguet | B60C 23/0408 340/447 |
| 2011/0198402 | A1* | 8/2011 | Tucker | B60C 23/0493 235/492 |

* cited by examiner

ELECTRONIC UNIT FOR MEASURING OPERATING PARAMETERS OF A VEHICLE WHEEL

CROSS REFERENCE TO RELATED APPLICATIONS

This application is the U.S. National Phase Application of PCT International Application No. PCT/FR2018/051549, filed Jun. 26, 2018, which claims priority to French Patent Application No. 1755855, filed Jun. 27, 2017, the contents of such applications being incorporated by reference herein.

FIELD OF THE INVENTION

The present invention relates to an electronic unit for measuring operating parameters of a vehicle wheel.

BACKGROUND OF THE INVENTION

More and more motor vehicles have, for security purposes, detection systems comprising electronic control units mounted on each wheel of the vehicle and containing sensors for measuring parameters such as the radial acceleration of the wheel as well as the pressure and the temperature of the tire fitted to this wheel.

These monitoring systems are conventionally equipped, on the one hand, with electronic units (also called "wheel units") mounted on each of the vehicle wheels and integrating the electronics, namely, in addition to the aforementioned sensors, a microprocessor, a memory and a radio frequency transmitter, and, on the other hand, a central unit (mounted on the vehicle) for receiving the signals emitted by the radio frequency transmitters of each wheel, comprising an electronic control unit (ECU) incorporating a radio frequency receiver connected to an antenna. Therefore, the electronic units measure certain tire parameters and send them, in whole or in part, to the electronic control unit of the vehicle so that it determines a condition of the wheel or of the vehicle.

There are now several embodiments of electronic units.

According to a first embodiment of the prior art, illustrated in FIG. 1, the electronic units 100 consist of a housing 110 containing all the management electronics 120 (including an antenna 121) and the supply battery 130 of the unit, said housing 110 comprising a receptacle 110a and a cover 110b, its closure being achieved by welding said cover on said receptacle. Such an electronic unit 100 is mounted on a tire inflation valve V. According to this embodiment, the housing generally comprises a sleeve 140 making it possible to mount the electronic unit on the inflation valve V, the electronic unit then being connected to the inflation valve with screws.

The major disadvantage of these electronic units is that if a loose metal particle remains in the electronic housing 110 before the cover 110b is welded, there is a risk that this particle may generate a short circuit in contact with the management electronics 120, which may damage the latter.

It was therefore proposed to fill the electronic housing with polyurethane before closing it with the cover 110b. However, although responding to the aforementioned problem, the disadvantage of this embodiment is its poor dynamic performance due to its higher weight.

According to another embodiment of the prior art illustrated in FIG. 2, the electronic unit 200 does not include a welded housing. Indeed, in this embodiment, the management electronics 210 (comprising an antenna 211) are completely overmolded with polyurethane. The electronic unit according to this embodiment is configured to be mounted in an envelope (or sock, not shown) bonded to the internal surface of the tire.

The interesting advantage of this embodiment is that of having a device whose electronics are protected from a potential risk of short circuit due to possible loose metal particles, as previously described, while the weight is reduced by the removal of the external housing that encloses the polyurethane in the aforementioned previous version.

However, the electronic unit, as described in the embodiment, suitable for being mounted on the internal surface of the tire (namely, when the latter is protected by an overmolding and not a housing—FIG. 2), although having interesting advantages, is not suitable for being mounted on the inflation valve of said tire.

Another problem of the state of the art is that it is necessary to have different products, depending on whether the electronic unit is to be placed on the tire inflation valve or on said tire.

SUMMARY OF THE INVENTION

An aspect of the present invention is an overmolded electronic unit free from the aforementioned disadvantages.

According to an aspect of the invention, this is achieved thanks to an electronic unit of a tire monitoring system suitable for being mounted either on the tire inflation valve or on the internal surface of said tire, remarkable in that it includes:

management electronics of the electronic unit comprising sensors for measuring parameters of said tire, a microprocessor and a supply battery, and an antenna configured to be mountable on the management electronics;

mechanical and electrical connection means for the antenna and the management electronics;

the management electronics thus forming a common base capable of being used with an antenna that can be adapted according to the intended location of the electronic unit, either on the inflation valve of the tire, or on the internal surface of the tire.

Thus, the mounted antenna may be adapted according to its intended use, thus making it possible to have common base management electronics whatever the intended location of the electronic unit, said antenna being mountable both on the tire inflation valve and on the internal surface of the tire.

According to a preferred embodiment, the antenna is made of brass with a plastic overmolding.

According to an advantageous embodiment, the antenna is made of printed plastic.

According to an advantageous embodiment, the antenna is inserted into a plastic housing.

According to an advantageous embodiment, the antenna comprises a sleeve capable of cooperating with an inflation valve to allow it to be secured to the latter.

This embodiment allows the use of overmolded management electronics for better protection of the latter, while allowing use on the tire inflation valve.

According to a preferred and advantageous embodiment, the antenna has a support tab arranged in the longitudinal extension of the antenna opposite the sleeve.

This support tab has the interesting advantage of forming a contact interface with the rim tape of the wheel on which the electronic unit is mounted so as to keep a functional clearance between the management electronics and said rim tape, thus preventing forces from being applied to the management electronics and damaging the latter.

According to an advantageous embodiment, the mechanical and electrical connection means of the antenna and the management electronics consist of protruding fastening pins.

According to another advantageous embodiment, the mechanical and electrical connection means of the antenna and the management electronics consist of fastening lugs.

According to another advantageous embodiment, the antenna has openings for the passage of an overmolding material, at least in part on its longitudinal sides.

Thus, during the overmolding of the electronic unit, the connection between the antenna and the management electronics is stiffened.

According to an advantageous embodiment, the metal portion of the antenna extends into the sleeve.

Thus, the radiation from the antenna is extended and improved by the inflation valve.

According to another advantageous embodiment, the antenna is a loop antenna.

This advantageous embodiment makes it possible to have a more robust antenna having two anchor points.

BRIEF DESCRIPTION OF THE DRAWINGS

Other subject matters, characteristics and advantages of aspects of the present invention will emerge from the description which follows by way of nonlimiting example with reference to the accompanying drawings in which.

DETAILED DESCRIPTION OF THE PREFERRED EMBODIMENTS

Figure 1:
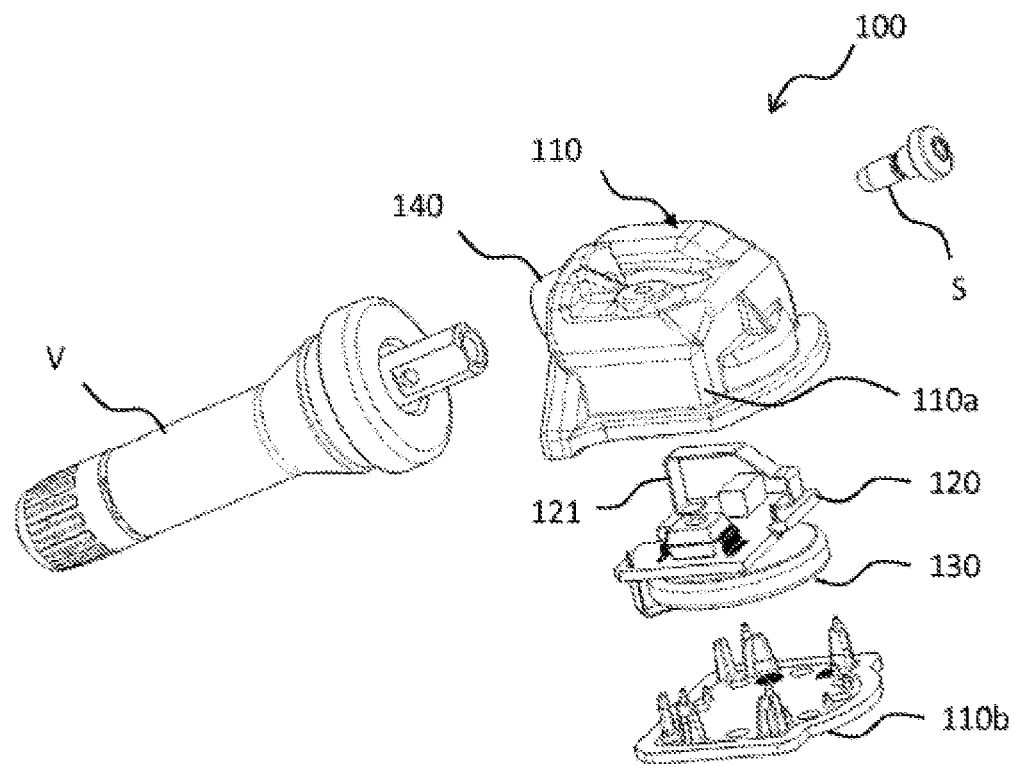
FIG. 1, already discussed, is an exploded perspective view of an electronic unit and an inflation valve according to a first embodiment of the prior art.
Figure 2:
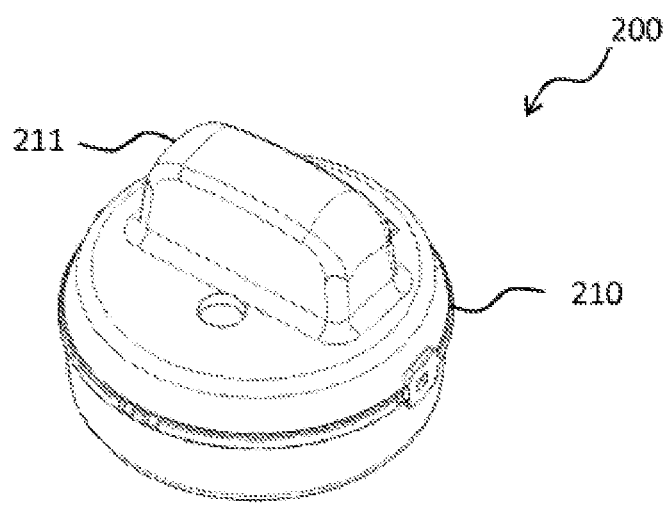
FIG. 2, already discussed, is a perspective view of an electronic unit according to a second embodiment of the prior art.

The electronic unit 1 according to an aspect of the invention, shown by way of example in FIGS. 3 to 9, is intended to be mounted on a wheel of a vehicle for measuring operating parameters (pressure, temperature, acceleration, etc.) of said wheel, and for transmitting the measured data to a central unit (not shown) mounted on the vehicle.

This electronic unit 1, adapted to be mounted inside a tire casing, comprises management electronics 2 of the electronic unit 1 comprising sensors 3 for measuring the parameters of said tire such as the radial acceleration of the wheel, pressure and temperature of the tire fitted to this wheel, a microprocessor 4 and a supply battery 5.

The electronic unit 1 according to an aspect of the invention is remarkable in that it comprises an external antenna 6 whose characteristics may be adjusted according to the intended location (on the tire inflation valve or on the internal surface of the tire) of said electronic unit.

Therefore, the antenna 6 according to an aspect of the invention is configured to be mountable on the management electronics 2 of the electronic unit 1, through mechanical and electrical connection means 7.

Figure 3:
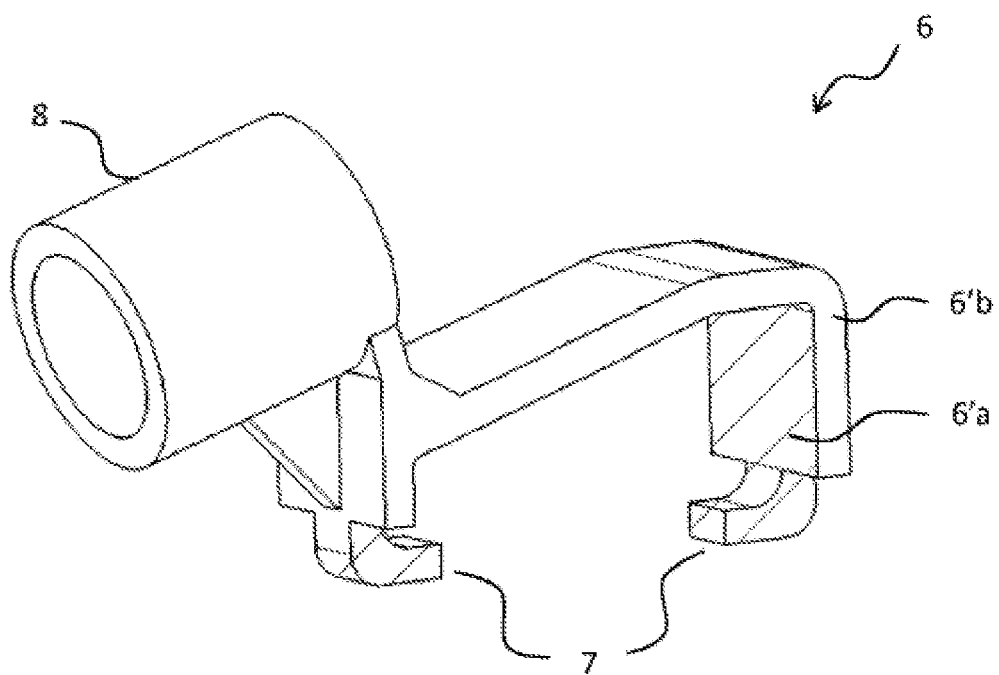
FIG. 3 is a perspective view of a first embodiment of the mounted antenna according to an aspect of the invention.

According to an exemplary embodiment illustrated in FIG. 3, these mechanical and electrical connection means 7 of the antenna 6 and the management electronics 2 consist of protruding fastening pins, the antenna 6 thus configured being able to be mounted on the management electronics 2 by fitting into openings (not shown) provided in the latter.

Figure 4:
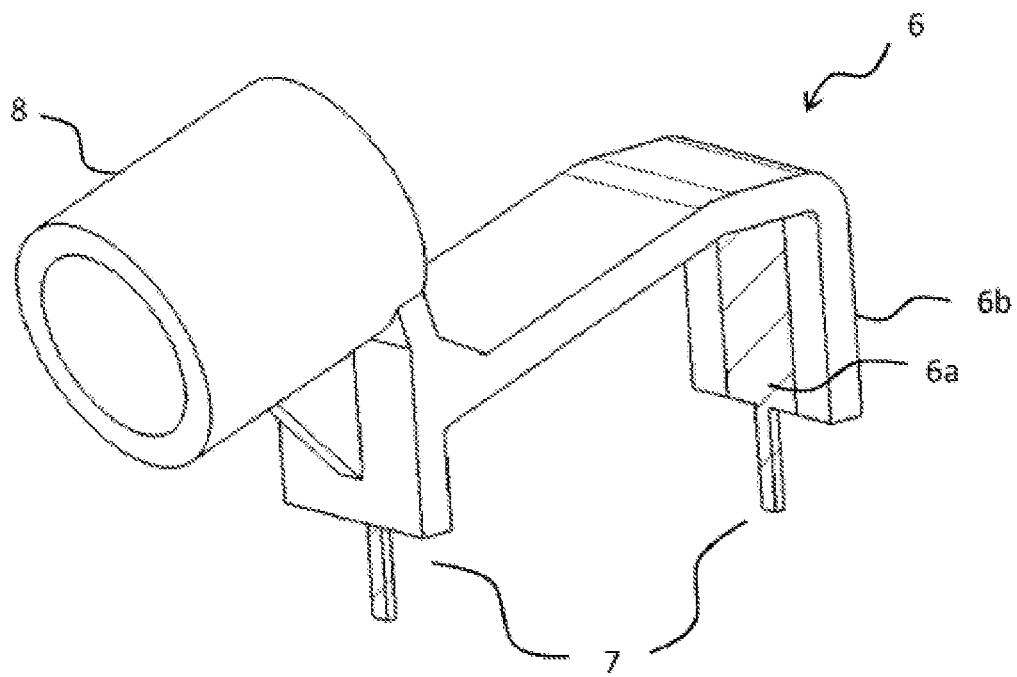
FIG. 4 is a perspective view of another exemplary embodiment of the mounted antenna according to an aspect of the invention.
Figure 5:
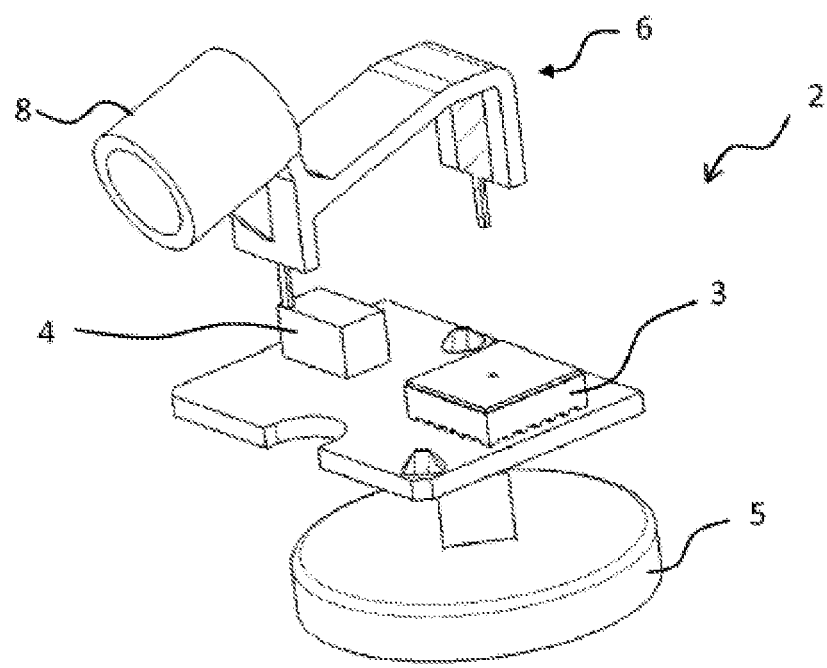
FIG. 5 is an exploded perspective view of an exemplary embodiment of an electronic unit according to an aspect of the invention comprising a mounted antenna according to FIG. 4.
Figure 9:
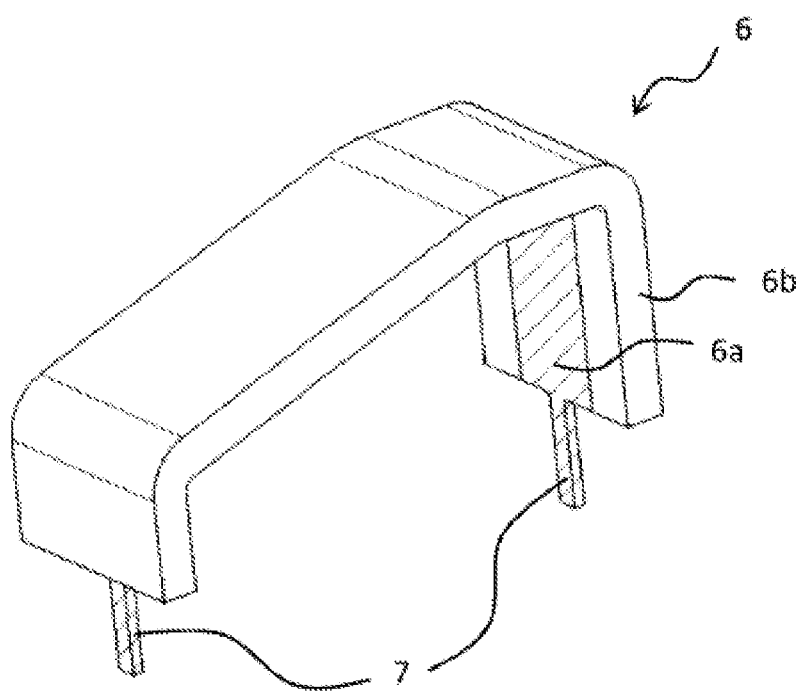
FIG. 9 is a schematic perspective view of another embodiment of the mounted antenna according to an aspect of the invention.

According to another advantageous exemplary embodiment illustrated in FIGS. 4 and 9, the mechanical and electrical connection means 7 of the antenna 6 and the management electronics 2 consist of fastening tabs, the antenna 6 thus being configured to be able to be forcefully inserted into the management electronics 2 in the corresponding openings (not shown) provided in the latter.

The external antenna 6 according to an aspect of the invention may be manufactured in any known manner. For example, it is made of brass 6a with a plastic overmolding 6b, or printed plastic, the tracks 6'a being directly printed, in a manner known per se, on a plastic 6'b, or else the brass antenna is inserted into a plastic housing.

According to the exemplary embodiments illustrated in FIGS. 3 to 8, the mounted antenna 6 comprises a sleeve 8 capable of cooperating with an inflation valve V to allow its fastening to the latter, this fastening being performed in a manner known per se, for example, by means of a worm screw.

The antenna 6 may thus come in several forms which make it possible for the electronic unit 1, to which said antenna is equipped, to be mountable on different locations of a vehicle wheel whose parameters are to be monitored, said electronic unit 1 having the same management electronics 2, whatever its final intended location.

Figure 8:
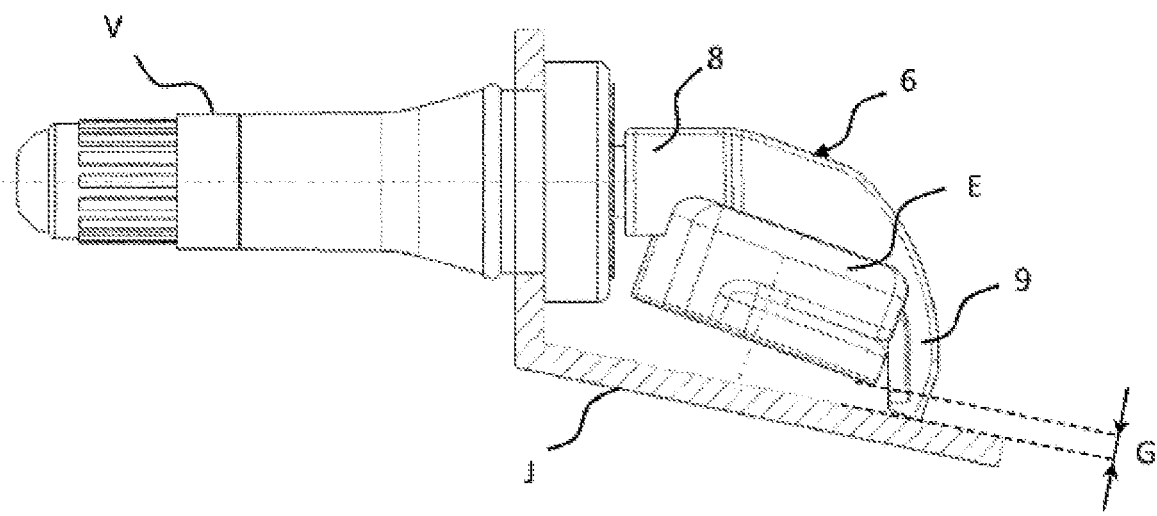
FIG. 8 is a side view illustrating the electronic unit of FIG. 7 shown mounted on the inflation valve of a tire.

Thus, such an electronic unit 1 may then consist of common base management electronics 2 (i.e., without antenna) and an antenna 6 without sleeve when it is intended to be bonded to the internal surface of a vehicle wheel tire (FIG. 8).

Alternatively, such an electronic unit 1 may consist of common base management electronics 2 (i.e., without antenna) and an antenna 6 with sleeve when it is intended to be mounted on the tire inflation valve of a vehicle wheel (FIGS. 3 to 8).

In other words, depending on whether it is intended to be bonded on the internal surface of the tire or to be mounted on the tire inflation valve, the electronic unit 1 according to an aspect of the invention has a common base consisting of the management electronics 2, and a mounted antenna 6 adapted (i.e., with or without a sleeve) according to the intended location (namely, the internal surface of the tire or the tire inflation valve).

When its intended location is to be fastened on a tire inflation valve V (FIG. 8), the antenna 6 has a support tab 9 arranged in the longitudinal extension of the antenna opposite the sleeve. This support tab 9 has the interesting advantage of forming a contact interface with the rim tape J of the wheel on which the electronic unit 1 is mounted. This way, a functional clearance G is intrinsically created between the management electronics 2 and said rim tape J, thus making it possible to prevent the management electronics 2 from bearing directly against said rim tape J at the risk of being damaged.

The set formed by the management electronics 2 and the antenna 6 adapted to the intended location of the electronic unit 1 is overmolded, for example, by reaction injection molding (RIM) with polyurethane.

Figure 6:
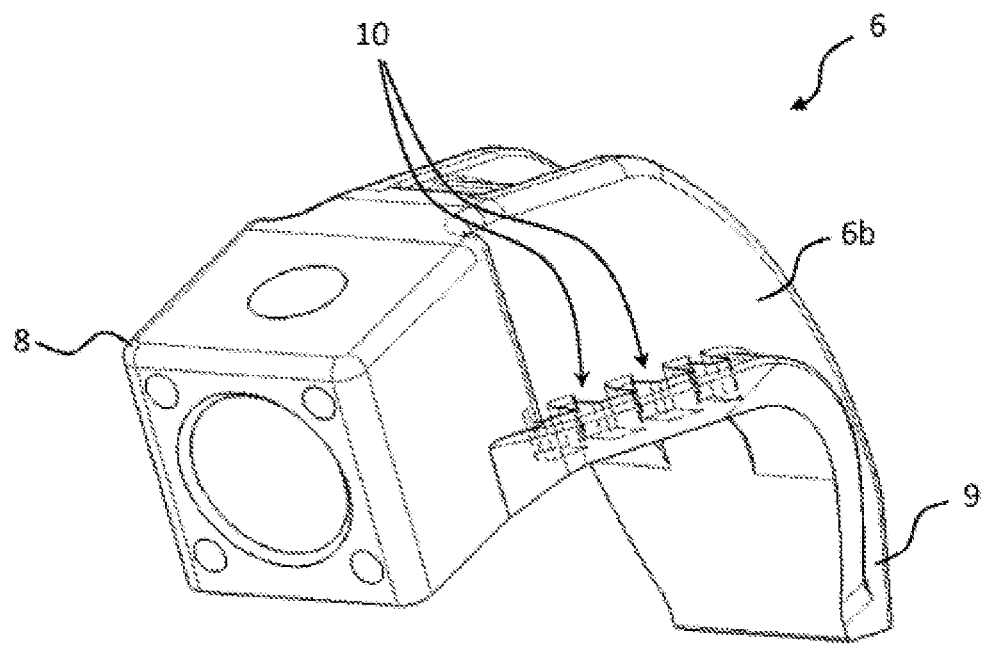
FIG. 6 is a perspective view of another exemplary embodiment of the mounted antenna according to an aspect of the invention.
Figure 7:
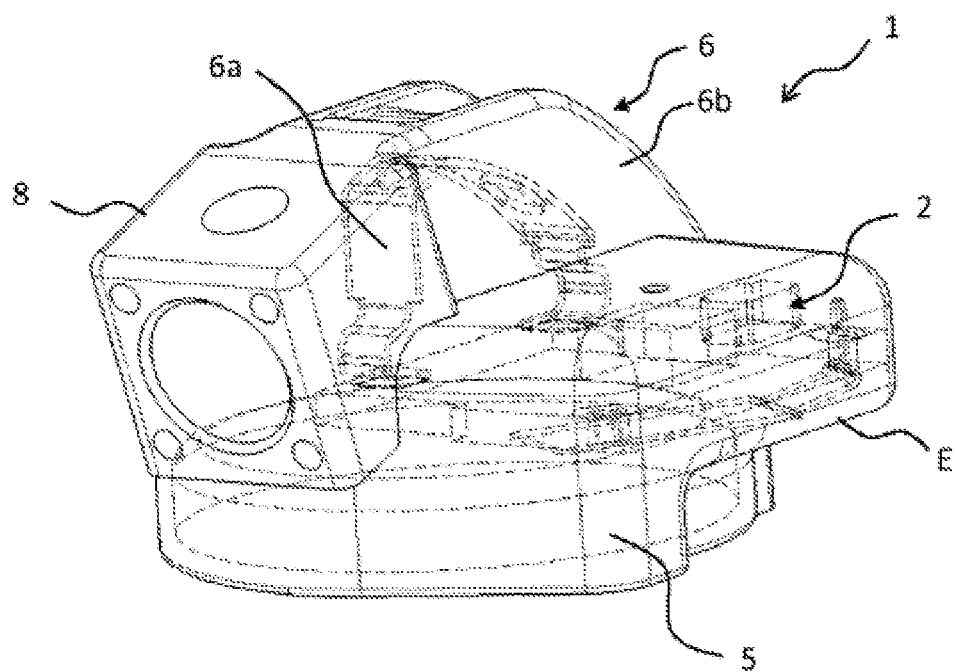
FIG. 7 is a perspective view of another exemplary embodiment of the electronic unit according to an aspect of the invention comprising a mounted antenna according to FIG. 6.

Advantageously, as illustrated in FIG. 6, the antenna 6 has openings 10, for example, at least in part on its longitudinal sides. These openings 10 allow the passage of the overmolding material E so as to form a stiffening spear of the mechanical connection between the mounted antenna 6 and the management electronics 2 during their overmolding.

The antenna 6 according to an aspect of the invention may have any shape.

According to the exemplary embodiments illustrated in FIGS. 3 to 9, the antenna is a loop antenna.

According to yet another interesting exemplary embodiment (not shown), the metal part 6b or 6'b of the antenna 6 extends into the sleeve 8 when intended to be mounted on a tire inflation valve V. As a result, the range of the antenna 6 is extended by the metal part of the valve so that the latter serves as an antenna, thus improving the radiation of the antenna 6.

The invention claimed is:

1. An electronic unit of a tire monitoring system capable of being fastened either on a tire inflation valve or on an internal surface of said tire, comprising:
    management electronics of the electronic unit comprising sensors for measuring parameters of said tire, a microprocessor and a supply battery;
    a housing containing the management electronics;
    mechanical and electrical connection means for the management electronics;
    the management electronics with the mechanical electrical connection means forming a common base configured to be connected with a plurality of antennas; and
    at least one of the plurality of antennas, the at least one of the plurality of antennas having a first portion external to the housing and configured to be mounted on the management electronics via the mechanical and electrical connection means by insertion of a second portion of the at least one of the plurality of antennas into the housing, the at least one of the plurality of antennas being selected according to an intended location of the electronic unit, the intended location including a first location on the tire inflation valve and a second location on the internal surface of the tire.

2. The electronic unit according to claim 1, wherein the at least one of the plurality of antennas is made of brass with a plastic overmolding.

3. The electronic unit according to claim 1, wherein the at least one of the plurality of antennas is made of printed plastic.

4. The electronic unit according to claim 1, wherein the housing is a plastic housing.

5. The electronic unit according to claim 1, wherein the mechanical and electrical connection means of the at least one of the plurality of antennas and the management electronics comprises protruding pins.

6. The electronic unit according to claim 1, wherein the mechanical and electrical connection means of the at least one of the plurality of antennas and the management electronics comprises fastening tabs.

7. The electronic unit according to claim 1, wherein the at least one of the plurality of antennas has openings for the passage of a molding material, at least in part of its longitudinal sides.

8. The electronic unit according to claim 1, wherein the at least one of the plurality of antennas comprises a sleeve capable of cooperating with an inflation valve to allow its fastening on the latter.

9. The electronic unit according to claim 8, wherein the at least one of the plurality of antennas has a support tab arranged in a longitudinal extension of the at least one of the plurality of antennas opposite the sleeve.

10. The electronic unit according to claim 9, wherein the at least one of the plurality of antennas includes a metal part, and the metal part extends into the sleeve.

11. The electronic unit according to claim 1, wherein the at least one of the plurality of antennas is a loop antenna.

12. The electronic unit according to claim 2, wherein the at least one of the plurality of antennas is made of printed plastic.

13. The electronic unit according to claim 2, wherein the housing is a plastic housing.

* * * * *